(12) United States Patent
Grow

(10) Patent No.: US 7,464,954 B2
(45) Date of Patent: Dec. 16, 2008

(54) MOTORCYCLE SKIDPLATE

(76) Inventor: Gordon G. Grow, 4010 Foothill Blvd., Oakland, CA (US) 94601

( * ) Notice: Subject to any disclaimer, the term of this patent is extended or adjusted under 35 U.S.C. 154(b) by 0 days.

(21) Appl. No.: 10/998,275

(22) Filed: Nov. 26, 2004

(65) Prior Publication Data

US 2006/0113747 A1    Jun. 1, 2006

(51) Int. Cl.
*B62J 27/00* (2006.01)
(52) U.S. Cl. .................................................. 280/304.3
(58) Field of Classification Search ............. 280/304.3, 280/848, 850; 296/199, 204; 193/105; D12/126
See application file for complete search history.

(56) References Cited

U.S. PATENT DOCUMENTS

| | | | | |
|---|---|---|---|---|
| 3,829,110 A | * | 8/1974 | Ray ............................. | 280/8 |
| 4,327,931 A | * | 5/1982 | Winiecki ..................... | 280/295 |
| D274,803 S | * | 7/1984 | Hughes ....................... | D12/126 |
| 4,655,307 A | * | 4/1987 | Lamoureux ................. | 180/69.1 |
| 4,785,626 A | * | 11/1988 | Shiraishi ...................... | 60/313 |
| 4,799,569 A | * | 1/1989 | Hattori et al. ............... | 180/219 |
| 5,474,146 A | * | 12/1995 | Yoshioka et al. ............ | 180/184 |
| 5,484,153 A | * | 1/1996 | Ricciardi ..................... | 280/293 |
| 6,446,996 B1 | * | 9/2002 | Horii ........................... | 280/281.1 |
| 2004/0255909 A1 | * | 12/2004 | Kurokawa et al. .......... | 123/472 |

* cited by examiner

*Primary Examiner*—Kevin Hurley
(74) *Attorney, Agent, or Firm*—John P. Sutton

(57) ABSTRACT

A motorcycle skidplate is disclosed to protect motorcycle oil vessels and lines from rupture by foreign objects, resulting in oil being interposed between a motorcycle wheel and the surface being traversed, causing a loss of control of the motorcycle. In particular, oil pans exposed below the motorcycle frame are susceptible to rupture by foreign objects during use.

6 Claims, 5 Drawing Sheets

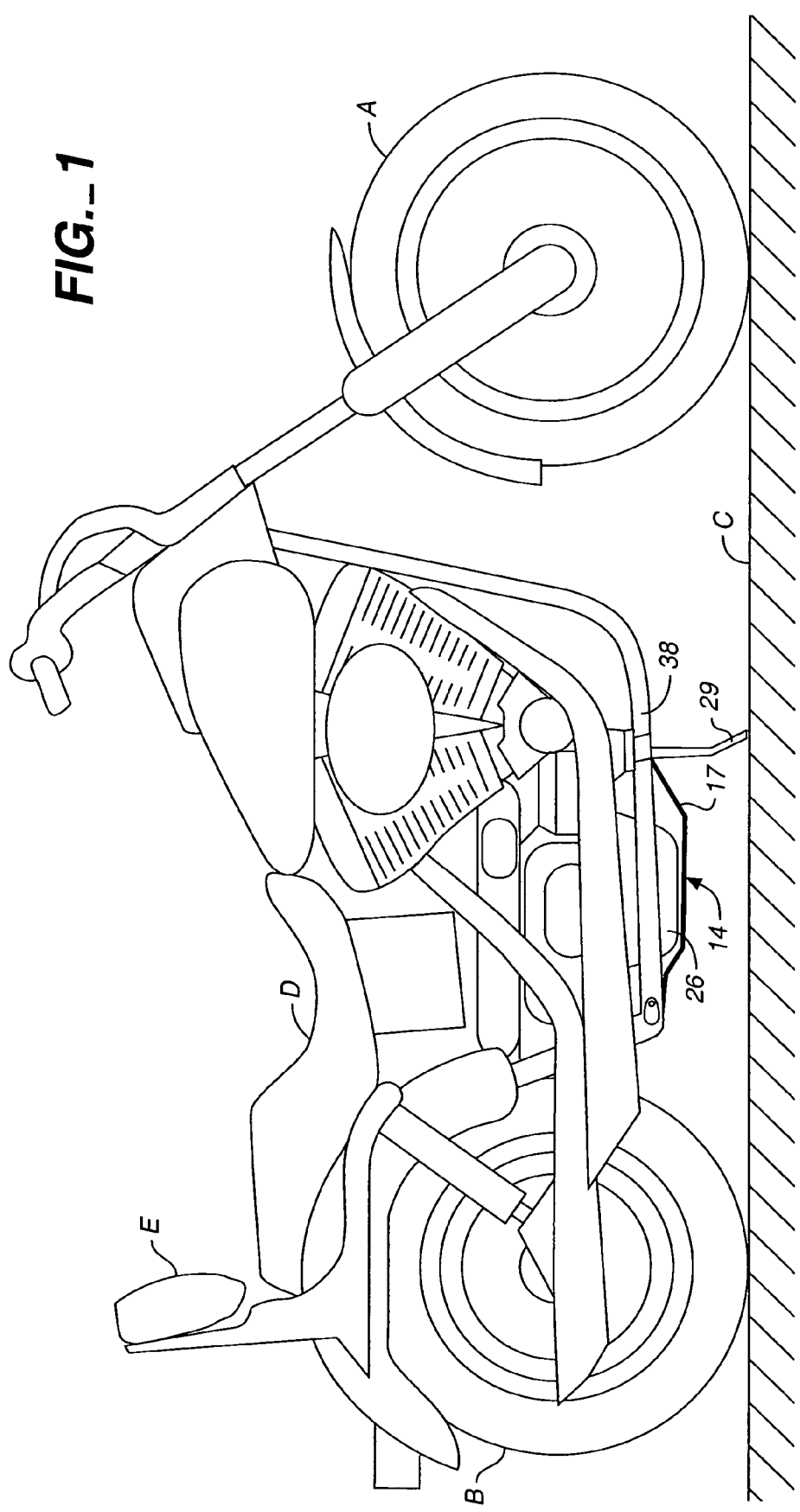

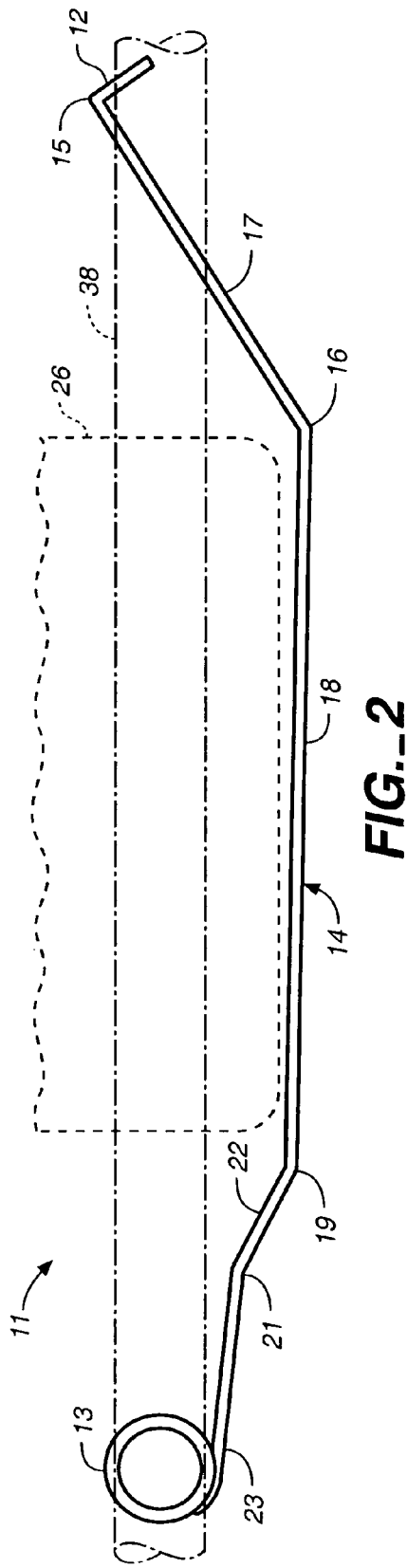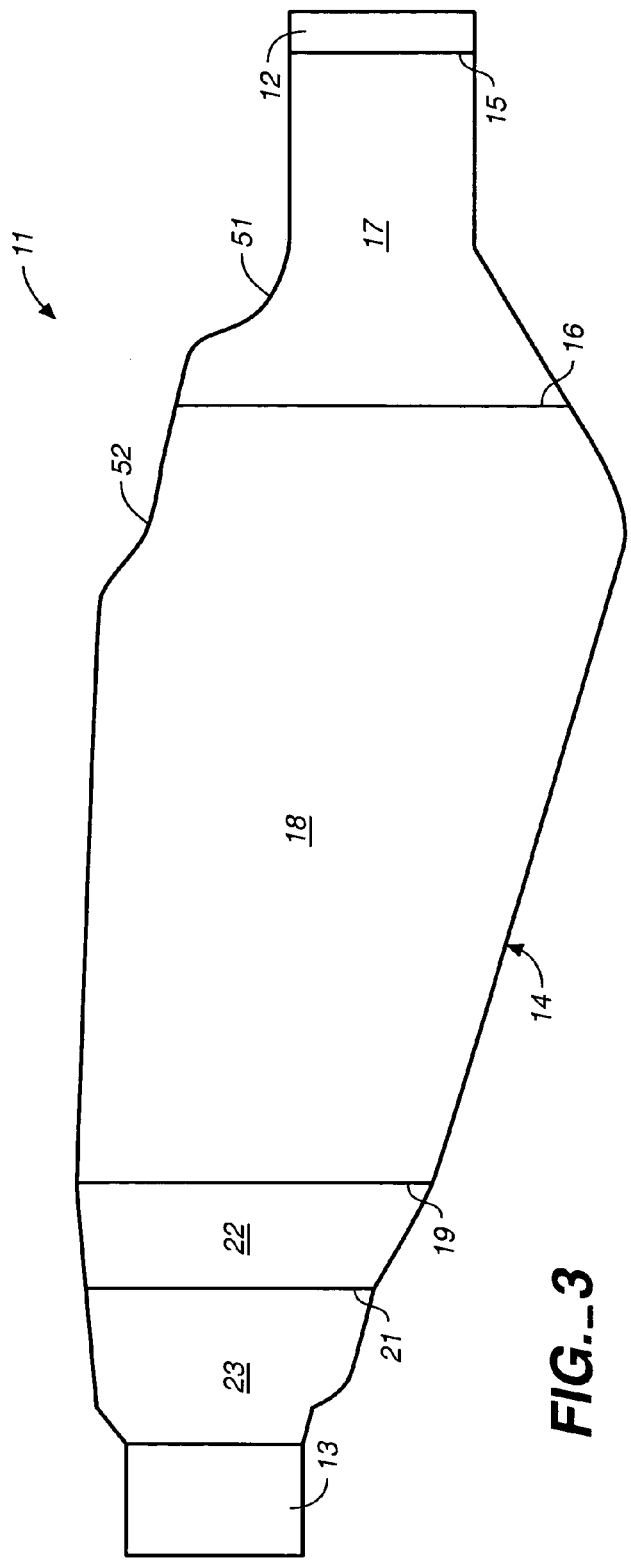

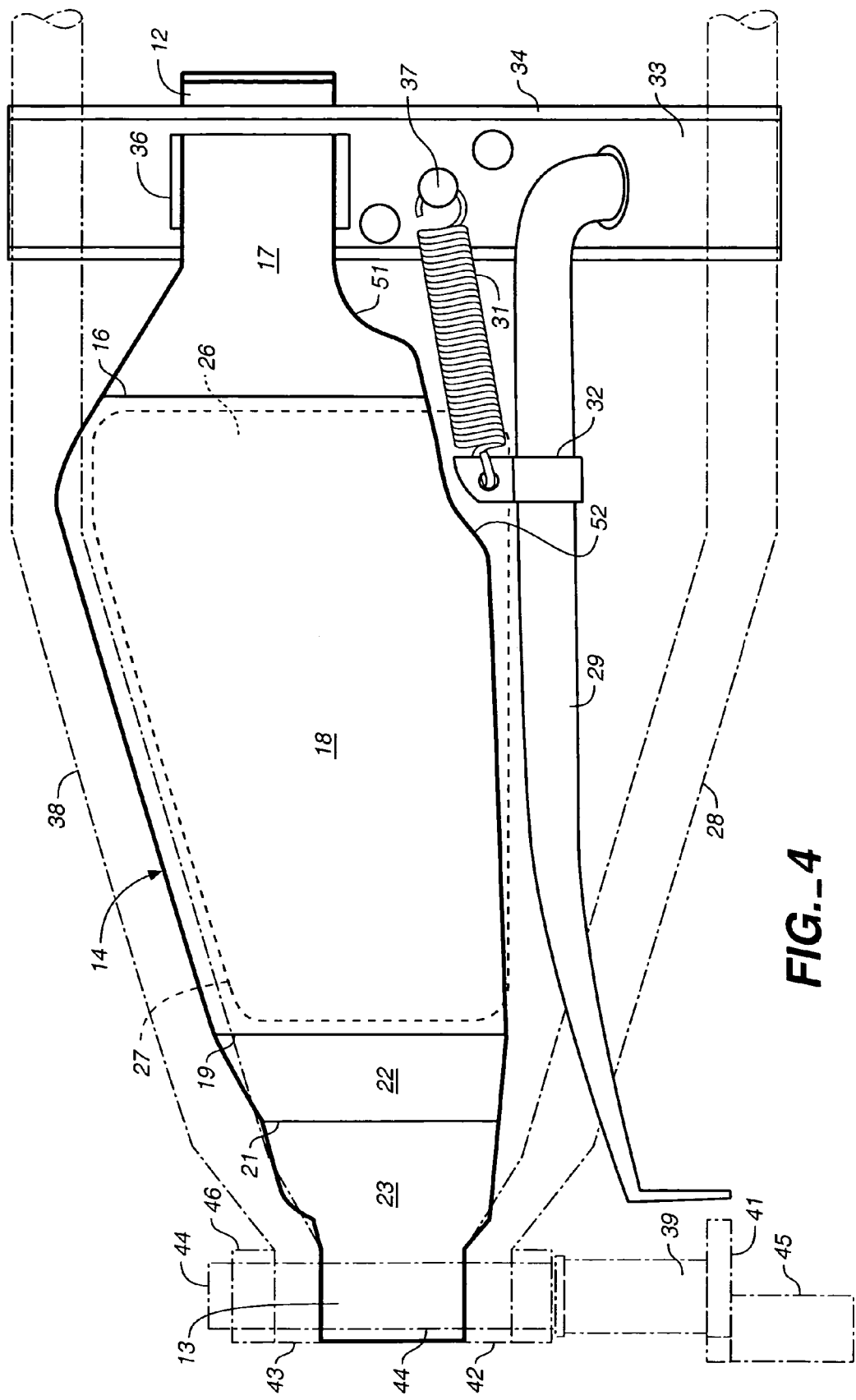
FIG._4

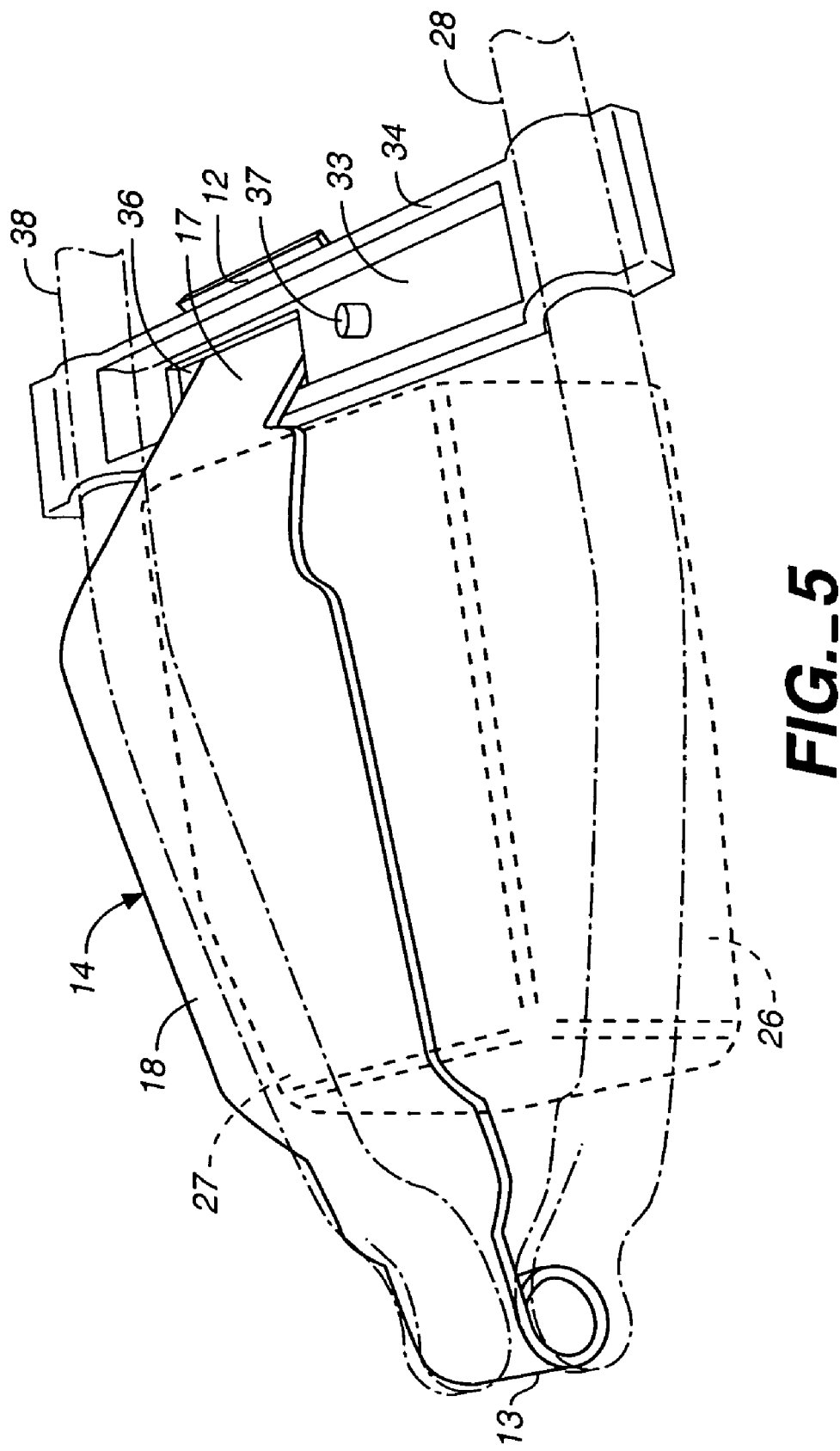
FIG._5

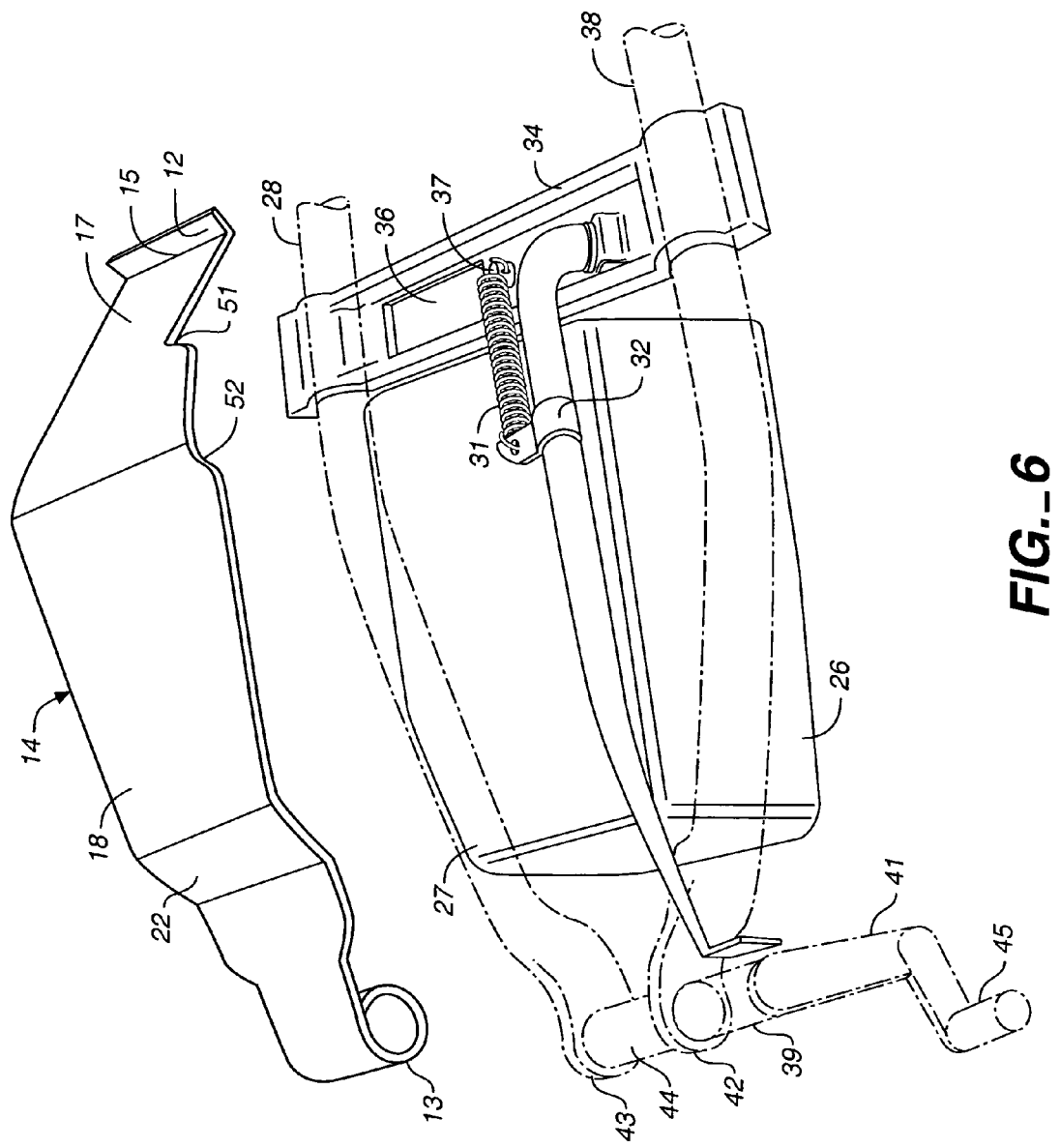
FIG._6

MOTORCYCLE SKIDPLATE

This invention relates to an after-market safety feature for motorcycles to prevent rupture of the oil pan on certain models of motorcycle. A motorcycle typically comprises a frame, a front wheel, a rear wheel, an engine and a drive train. On some models of motorcycle, the oil pan for the engine is protected by the frame from any damage from rocks, curbs or abrupt grade changes. In other models, the oil pan extends below the frame and is susceptible to damage from objects that rupture the oil pan and release oil beneath the rear wheel. Such ruptures can have catastrophic, even fatal, consequences for the rider because oil on tires causes a loss of control of the motorcycle, with a risk of collision with vehicles, trees, poles and other objects.

SUMMARY OF THE INVENTION

This invention is a plate secured to a motorcycle frame that extends below the oil pan and is spaced sufficiently from the oil pan to allow the plate to flex and absorb impact energy without breaking the pan itself. The plate must cover the pan to protect it from impact from road objects while at the same time not interfering with the operation of other features of the motorcycle, such as the kickstand and the passenger foot peg. Preferably, the plate is secured fore and aft and has a curvature that enables the plate to flex upon impact with an object to absorb energy without touching the oil pan.

BRIEF DESCRIPTION OF THE DRAWINGS

FIG. 1 is a side view of a conventional motorcycle with the skidplate of this invention below the oil pan.

FIG. 2 is a left side view of the plate of this invention.

FIG. 3 is a top view of the plate before installation.

FIG. 4 is a partial bottom view of the skidplate as installed, secured to the frame (shown in phantom) at the aft end and to the cross member 34 at the forward end, which in turn Is secured to the frame.

FIG. 5 is an isometric view of the skid plate as installed over the oil pan (in dashed lines) on an upside down motorcycle and secured to the cross member and the frame (shown in phantom). the oil pan protruding beyond the frame.

FIG. 6 is an exploded isometric view of the skidplate above the oil pan of an upside down motorcycle, and the cross member secured to the frame (shown in phantom).

DESCRIPTION OF THE PREFERRED EMBODIMENT

An example of the type of motorcycle that has the oil pan exposed beneath the frame is the FXD series of Harley-Davidson motorcycles sold under the "DYNA" trademark. This is one type of motorcycle that has an exposed oil pan below the frame. With modifications apparent to one skilled in the art, the plate can be adapted to any other model of motorcycle having an exposed oil pan.

FIG. 1 is a side view of a conventional motorcycle having the usual prior art parts of a front wheel A, and a rear wheel B for traversing a road surface C. The driver sits on seat D, and the passenger has a back rest E. An optional part for motorcycles is a passenger foot peg 41 secured to frame 38 to allow the passenger to rest a foot on foot rest 45 attached to peg 41 (FIGS. 4 and 6). The motorcycle at rest is held upright by kickstand 29, also prior art. The invention of skidplate 14 protecting oil pan 26 and secured to frame 38 is described with respect to the following Figures.

FIG. 2 is a view of the right side of a plate according to the invention with a forward lip 12 adapted to engage the frame 38 (shown in phantom) of the motorcycle and an aft tube 13 welded to plate 14. Tube 13 is designed to encircle the passenger foot peg mounting bracket to be described presently. Plate 14 is conveniently made of 10 gage steel to be able to absorb the shock of impact between a motorcycle with a rider and perhaps a passenger striking a hard object on the surface C being traversed (FIG. 1). Plate 14 is bent at suitable locations to provide flexure as well as accommodate the bottom carriage of the particular model of motorcycle. In the embodiment shown, lip 12 is approximately a 90 degree bend about one half inch from the forward end of the plate 14. A second bend 16 of approximately 30 degrees about five inches from the lip allows the plate 14 to clear the protruding oil pan 26 (shown in phantom). Span 17 from lip 12 to bend 16 provides curvature desired for allowing plate 14 to flex. The longest span 18 between bend 16 and bend 19 (approximately eight inches in this embodiment) extends beneath the oil pan to protect against rupture. Bend 19 is about 20 degrees upward to extend to bend 21, which is about 10 degrees downward to make the shortest span (less than 2 inches). The last span 23 extends from bend 21 to tube 13, the aft terminus of plate 14. In all, plate 14 is generally curved to allow flexing, yet rigid enough to repel impact from hard objects.

Of course, the bends and distances are intended to accommodate the "DYNA" motorcycles having a specific configuration. Other models will have other configurations, but all meet the requirement for rigidity to protect the relatively fragile oil pan (typically of cast aluminum) while flexing sufficiently to absorb impact energy.

FIG. 3 is a top view of the plate of FIG. 2. Notch 52 accommodates the movement of the kickstand and spring on the left side of the motorcycle. Lip 12 secures plate 14 to the frame and welded tube 13 encircles the mount for the passenger foot peg 41 (FIGS. 4 and 6). The bends 16, 19 and 21, separating segments 17, 18, 22 and 23 are visible in FIGS. 2 and 3.

FIG. 4 is a bottom view of the skidplate 14 covering the oil pan 26 (shown in dashed lines) when the motorcycle is turned upside down. for a DYNA motorcycle. When a motorcycle strikes a rock, curb or other obstacle without the plate of the present invention installed, the usual rupture at the corner 27, releases oil directly in front of the rear wheel, causing the loss of control by the cyclist. By protecting the oil pan 26 from damage, such accidents can be avoided.

FIG. 5 is a an isometric view of skidplate 14 secured to cross member 34 at the forward end and to frames 28 and 38 (shown in phantom) at the aft end of, an upended DYNA motorcycle showing the extent that oil pan 26 protrudes beyond (below) the left frame 28 and 38 of the motorcycle. Kickstand 29 is retracted by spring 31 which is secured at point 32 on the leg of kickstand (FIG. 4). The other end of the spring 31 is secured to the web of plate 33 of cross member 34 by bolt 37.

FIG. 4 shows that frame 28 and frame 38 converge aft of the oil pan 26 and are connected at tube 39 that rotatably holds passenger foot peg 41. Arm 42 attached to frame 38 and arm 43 attached to frame 28 secure peg bracket 44 about which peg 41 rotates. Peg 41 is held in place for passenger use by bolt 46. All of the aspects of FIG. 4 are standard equipment on the DYNA motorcycle.

FIG. 6 is an exploded view of the skidplate 14 and cross member 34 over oil pan 26 in an upended motorcycle that. illustrates how the plate 14 protects the oil pan 26 when installed. The lip 12 fits under the forward cross member 34 by passing through opening 36. (when upright above the member 34 to allow flexing). The aft end of plate 14 has tube 13 grasping bracket 44 of the peg 41 between frame arms 42 and 43. Kickstand 29 is Stowed in FIG. 6. When stowed, kickstand 29 fits next to plate 14. Notch 52 in plate 14 accommodates spring 31 in the stowed position Of course, different configurations can be made for plate 14 for different features of a motorcycle, as will be appreciated by one skilled in the art. The dimensions and shape are merely illustrative and are not intended to limit the invention.

The invention is used on all motorcycles that need protection from rupture of the oil pan or other susceptible parts of the motorcycle, such as oil lines and vessels, that can be struck by rocks, curbs, or other hard objects. While the Harley-Davidson model here described was the initial motorcycle for which a skidplate was constructed, one skilled in the art will be able to adapt the dimensions, angles and configuration for motorcycles of different design. The rider of the model in question suffered a fatal accident in 1999 when the impact of an obstacle on the oil pan ruptured it and caused oil to spread below the rear wheel causing loss of control. My acquaintance with the rider provided the motivation for the present invention. However, it is contemplated that the invention is used with other models of motorcycles that need impact resistance at critical locations like oil pans. In short, the invention encompasses motorcycle skidplates of all configurations within the skill of the art, and not just the "DYNA" model.

I claim:

1. In a motorcycle comprising at least a frame, a front wheel, a rear drive wheel, an engine disposed between the front wheel and the rear wheel and an oil pan extending at least partially beneath the engine, the improvement comprising a skidplate secured to the frame and located below the oil pan and forward of the rear drive wheel to prevent rupture of the oil pan by objects on the surface being traversed by the motorcycle.

2. A skidplate as in claim 1 comprising a body of steel plate shaped to be secured to the motorcycle frame in at least two mounting points fore and aft of the oil pan of the motorcycle to shield the oil pan from foreign objects below the oil pan.

3. A skidplate as in claim 2 wherein the steel plate is composed of at least ten gage steel.

4. A skidplate as in claim 2 wherein the oil pan is exposed below the motorcycle frame and the body is bent to be secured to the frame fore and aft of the oil pan and to generally curve below the oil pan to shield it from foreign objects.

5. A skidplate as in claim 4 wherein the body is spaced sufficiently from the oil pan to allow the body to flex upon impact with a foreign object to absorb the energy of impact without contacting the oil pan.

6. A skidplate as in claim 4 wherein the body has a forward lip to engage the motorcycle frame and allow the skidplate to flex inwardly towards, but not contacting, the oil pan, and has an aft appendage to engage a mounting bracket affixed to the frame.

* * * * *